United States Patent
Gu

(10) Patent No.: US 9,651,124 B2
(45) Date of Patent: May 16, 2017

(54) OIL PUMPING UNIT WITH PINION RECIPROCATING ON RACK

(76) Inventor: Xinyi Gu, Dongying (CN)

(*) Notice: Subject to any disclaimer, the term of this patent is extended or adjusted under 35 U.S.C. 154(b) by 517 days.

(21) Appl. No.: 14/343,663

(22) PCT Filed: Dec. 9, 2011

(86) PCT No.: PCT/CN2011/083730
§ 371 (c)(1),
(2), (4) Date: May 12, 2014

(87) PCT Pub. No.: WO2013/033959
PCT Pub. Date: Mar. 14, 2013

(65) Prior Publication Data
US 2014/0238160 A1    Aug. 28, 2014

(30) Foreign Application Priority Data

Sep. 10, 2011  (CN) .......................... 2011 1 0280898

(51) Int. Cl.
*F16H 19/04* (2006.01)
*F04B 47/02* (2006.01)
*E21B 43/12* (2006.01)

(52) U.S. Cl.
CPC ......... *F16H 19/043* (2013.01); *E21B 43/126* (2013.01); *F04B 47/02* (2013.01); *F04B 47/022* (2013.01); *Y10T 74/18088* (2015.01)

(58) Field of Classification Search
CPC ........ F16H 19/043; E21B 19/02; E21B 19/08; E21B 43/12; E21B 43/121; E21B 43/126;
(Continued)

(56) References Cited

U.S. PATENT DOCUMENTS

| | | | | |
|---|---|---|---|---|
| 5,375,657 A | * | 12/1994 | Shi | ......................... F04B 47/026 166/105 |
| 7,001,157 B2 | * | 2/2006 | Xiaoxi | .................. E21B 43/126 166/68.5 |

(Continued)

FOREIGN PATENT DOCUMENTS

| CN | 2309442 | 3/1999 |
|---|---|---|
| CN | 2339787 | 9/1999 |

(Continued)

OTHER PUBLICATIONS

International Search Report dated May 31, 2012 for International Application No. PCT/CN2011/083730, International Filing Date Dec. 9, 2011 consisting of 3 pages.

(Continued)

*Primary Examiner* — William E Dondero
*Assistant Examiner* — Mark K Buse
(74) *Attorney, Agent, or Firm* — Christopher & Weisberg, P.A.

(57) ABSTRACT

An oil pumping unit with pinion reciprocating on rack has a base, a housing, crown block, a steel wire rope, a motor, a reducer, a pinion, and a rack. Rack seats are fixed on the inner sides of the front portion of the housing and the rack is secured on the rack seats. The two inner sides of the housing are guiding rails for the reciprocating frame. At each of the four corners of the reciprocating frame, a horizontal guiding wheel and a longitudinal guiding wheel are mounted, connecting to a pendulous frame via a hinge. The rear interior portion of the housing has a power cable box mounted, in the middle of which is an opening. Shelves are mounted on the upper portion of the housing. The steel wire rope (5) passes through the shelves.

9 Claims, 3 Drawing Sheets

(58) Field of Classification Search
CPC .. F04B 47/02; F04B 47/026; Y10T 74/18088; Y10T 74/18182; Y10T 74/18096; Y10T 74/18104; Y10T 74/18808
USPC .......................................................... 74/29
See application file for complete search history.

(56) References Cited

U.S. PATENT DOCUMENTS

| | | | | |
|---|---|---|---|---|
| 7,231,841 | B2* | 6/2007 | Ueki | B60R 7/04 74/29 |
| 8,047,821 | B2* | 11/2011 | Gu | E21B 43/126 166/105 |
| 2009/0266186 | A1* | 10/2009 | Gu | E21B 43/126 74/41 |
| 2014/0234126 | A1* | 8/2014 | Wu | E21B 43/126 417/56 |
| 2015/0330384 | A1* | 11/2015 | Xiang | F04B 19/22 417/536 |
| 2016/0160581 | A1* | 6/2016 | Mao | E21B 19/06 187/263 |

FOREIGN PATENT DOCUMENTS

| | | |
|---|---|---|
| CN | 2523947 | 12/2002 |
| CN | 2591225 | 12/2003 |
| CN | 201460829 U | 5/2010 |
| CN | 201771476 U | 3/2011 |

OTHER PUBLICATIONS

Written Opinion of the International Searching Authority in Chinese, along with English Translation, dated May 31, 2012 for International Application No. PCT/CN2011/083730, International Filing Date Dec. 9, 2011 consisting of 9 pages.

International Preliminary Report on Patentability dated Mar. 20, 2014 for International Application No. PCT/CN2011-083730, International Filing Date Dec. 9, 2011 consisting of 2 pages.

* cited by examiner

OIL PUMPING UNIT WITH PINION RECIPROCATING ON RACK

FIELD OF THE INVENTION

The present invention relates to equipments for oil production, in particular to an oil pumping unit with pinion reciprocating on rack.

BACKGROUND OF THE INVENTION

Currently, there are several types of oil pumping units in China, in which the most commonly used one is beam pumping unit. There are also non-beam pumping units, such as a chain pumping unit, belt pumping unit, endless rack pumping unit and the like. These oil pumping units have many advantages, and also have some disadvantages. The beam pumping unit is operated reliably, but has low energy transmission efficiency, and it is difficult to solve the problem of long stroke; the chain pumping unit has a more complicated structure and poor force bearing performance; the endless rack pumping units and tilted pumping units, which is presented recently, has a long endless rack reciprocating up and down, and if a long stroke is needed, the housing thereof has to be very high, which is difficult to realize and increases the equipment cost.

SUMMARY OF THE INVENTION

To solve the problems existing in the aforementioned equipments, the present invention provides an oil pumping unit with pinion reciprocating on rack, which is novel in structure, simple in operation, reliable in running and capable of solving the problems that a too high machine body is needed for a long stroke. The object of the present invention is to provide an oil pumping unit with pinion reciprocating on rack for the working sites.

The object of present invention is achieved as follows: an oil pumping unit with pinion reciprocating on a rack, comprises a base, a housing, a crown block, a steel wire rope, a motor, a reducer, a pinion and a rack. Wherein, a rack seat is fixed on the inner sides of the front portion of the housing, and the rack is secured on the rack seat, with the upper and lower portions thereof being both semicircular. The upper and lower portions of the rack seat are also both provided with semicircular rails, and the middle portion of the rails comprises separated rails. The two inner sides of the housing are provided with guiding rail for the reciprocating frame. On each of the four corners of the reciprocating frame, a horizontal guiding wheel and a longitudinal guiding wheel are mounted. On the upper middle of the reciprocating frame, there is mounted a hinge, which is connected to a pendulous frame inside thereof via a hinge link. An output shaft of the reducer is mounted with a pinion and a pinion pilot wheel, the pinion engaged with the rack. An arched rail for pendulous wheels is provided at the bottom of the reciprocating frame, and two pendulous wheels are mounted at the bottom of the pendulous frame and restrained by the arched rail. The reciprocating frame is connected to a steel wire rope at the upper portion thereof. At the back of the housing, with a power cable box is mounted, in the middle of which is a opening for passing power cable. Crown block are mounted on the upper portion of the housing, wherein two (2) double-groove sheaves or single-groove sheaves are arranged in the front portion, and two single-groove sheaves are arranged in the rear portion. The steel wire rope passes through the sheaves of the rear portion connects to a balance-weight box arranged outside the housing.

The reciprocating frame is connected to the steel wire rope at the upper portion thereof. The pendulous frame is mounted within the reciprocating frame and connected thereto via the hinge link. The reducer is arranged at the bottom of the pendulous frame, and the motor and an bevel gear box are mounted on a second shelf of the pendulous frame. Both the shaft of the bevel gear box and the shaft of the reducer are mounted with a chain wheel respectively, and a chain is mounted between the two chain wheels. Two pendulous wheels are mounted at the bottom of the pendulous frame and in the arched rail for pendulous wheels.

The balance-weight box is suspended outside the housing. A hanging ring is mounted at a middle point of the upper portion of the balance-weight box and connected to the steel wire rope. There is a rectangular opening provided at the side of the weight box proximal to the housing. A horizontal wheel and a longitudinal wheel are mounted at two sides of the box respectively nearby the rectangular opening. There is a rail outside the housing, in which the horizontal wheel and the longitudinal wheel are arranged. The outside portion of the box carries balance-weight.

The housing is a sealed rectangle box, manufactured windows are mounted in the front and rear portions of the box, and a power cable box is arranged in a rear interior portion of the housing. One side of the power cable box is the inner wall of the housing, while the other side is a baffle made of profile steel and rebar, in the middle of which is an opening. A cable conduit is mounted between the motor and the cable box, and the cable passes through the cable conduit and connects to the cable box. The cable passes through the cable box and connects to outside of the housing via a viewing window of the housing.

A pinion and a pinion pilot wheel are mounted on the shaft of the reducer coaxially, wherein the pinion is in the front while the pinion pilot wheel is at the back thereof. There is a projecting ribbon on the rack, which forms the rail for the pinion pilot wheel, together with the rack seat.

The oil pump unit with pinion reciprocating on rack is simple in structure, novel in form, convenient in operation, and reliable in running, and is capable of solving the problems of long stroke of the machine, i.e. the difficulty in oil pumping from deep or extra deep wells in the prior art. It improves the reliability, reduces the equipment cost and increases the productivity thereof.

1—base; 2—housing; 3—double-groove sheaves; 4—single-groove sheaves; 5—steel wire rope; 6—motor; 7—bevel gear box; 8—reducer; 9—pinion; 10—pinion pilot wheel; 11—rack; 12—rack seats; 13—semicircular rails; 14—right and left rails; 15—reciprocating frame; 16—pendulous frame; 17—horizontal guiding wheels; 18—longitudinal guiding wheels; 19—hinge; 20—hinge link; 21—shelf; 22—power cable box; 23 long and narrow opening; 24—balance-weight box; 25—pendulous wheels; 26—hanging ring; 27—chain; 28—horizontal wheels;

29—longitudinal wheels; 30—reinforce; 31—balance-weight; 32—pendulous wheel rail; 33—power cable; 34—cable conduit.

DETAILED DESCRIPTION OF THE INVENTION

Figure 1:
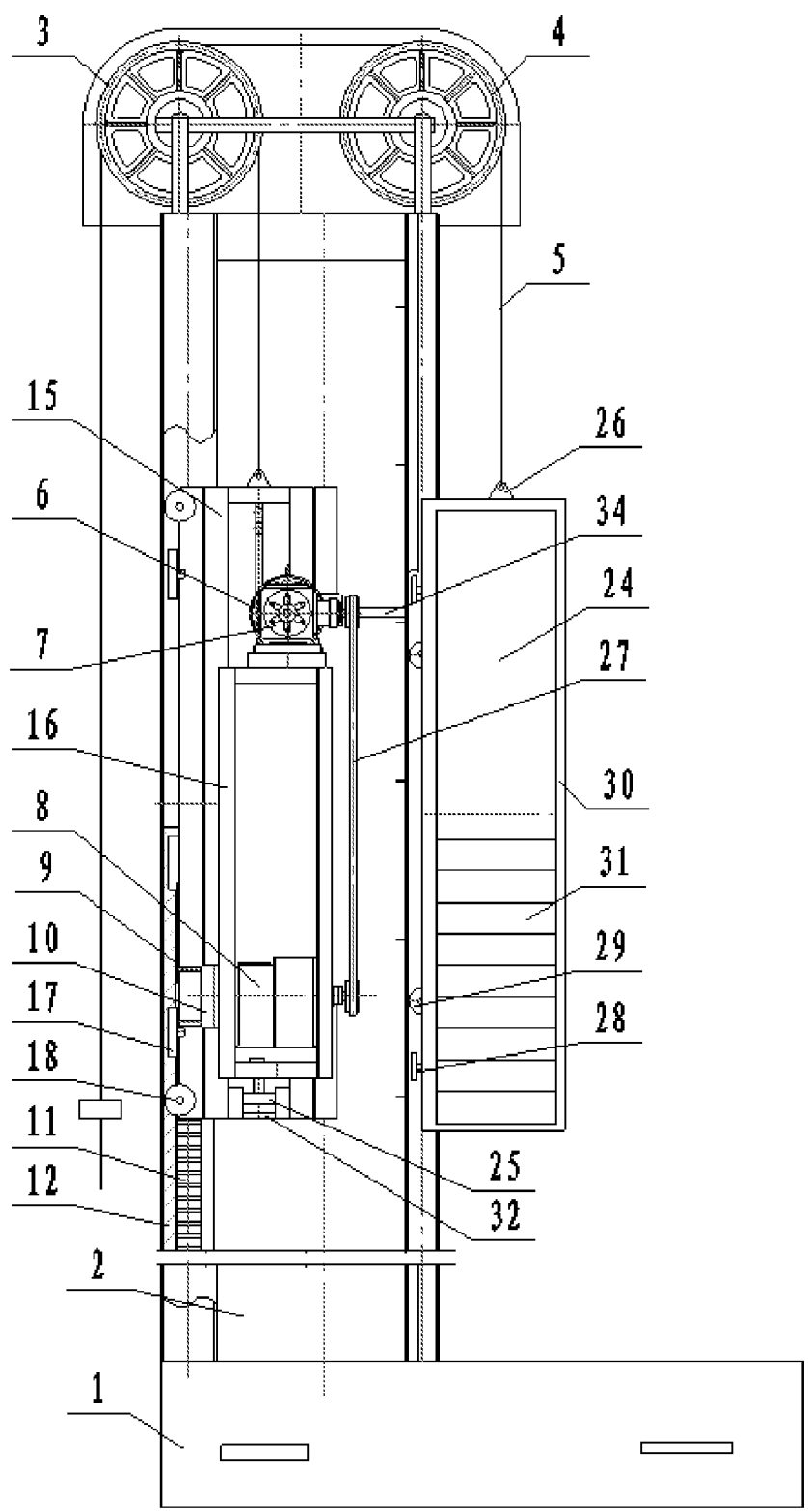
FIG. 1 is a schematic diagram of an oil pumping unit with pinion reciprocating on rack.
Figure 2:
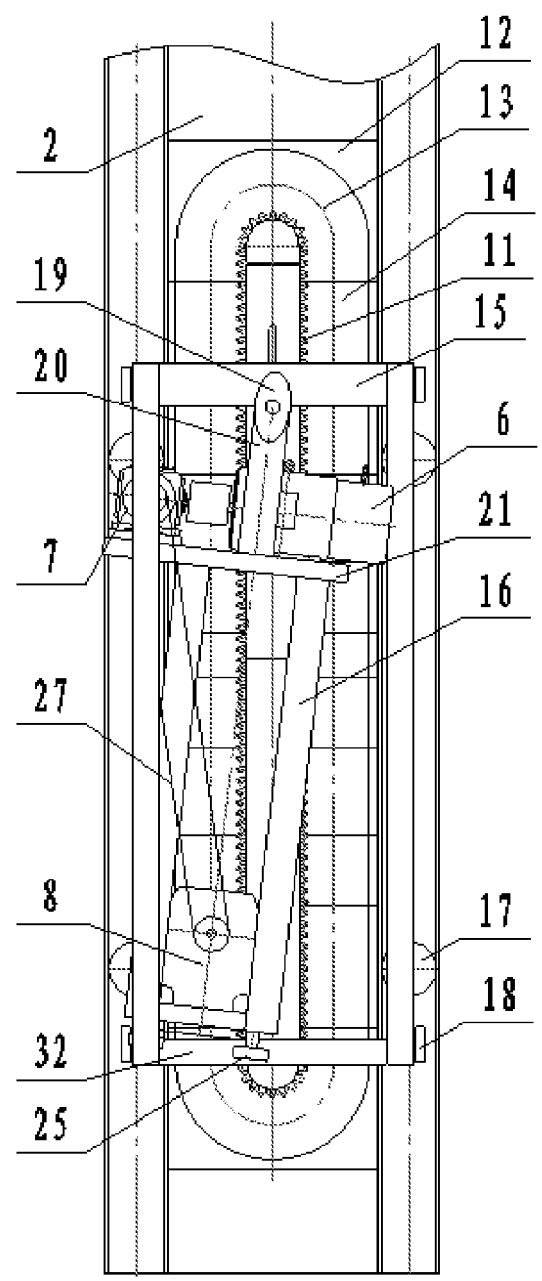
FIG. 2 is a schematic diagram of a reciprocating frame and a pendulous frame.
Figure 3:
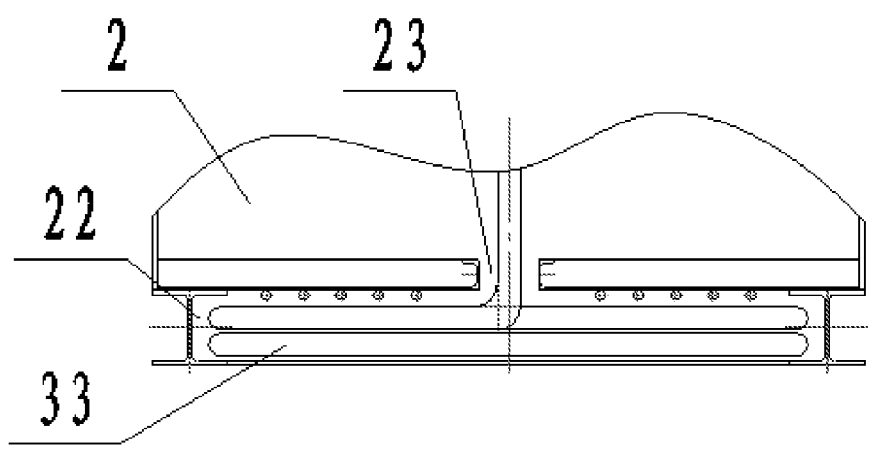
FIG. 3 is a schematic diagram of a power cable box.

Thereinafter the present invention will be further described with reference to the appended drawings, FIG. 1, FIG. 2, and FIG. 3.

An oil pumping unit with pinion reciprocating on rack, comprises a base 1, a housing 2, crown block and a steel wire rope 5, a motor 6, a reducer 8, a pinion 9, and a rack 11. Wherein, the rack seats 12 are fixed at inner sides of a front portion of the housing 2, and the rack 11 is secured on the rack seats 12. The upper and lower portions of the rack seats 12 include semicircular rails 13, and the middle portion thereof includes right and left rails 14. On the two inner sides of the housing 2 are mounted guiding rails for the reciprocating frame 15. Each of the four corners of the reciprocating frame 15 is provided with a horizontal guiding wheel 17 and a longitudinal guiding wheel 18. On the upper portion of the reciprocating frame 15 is mounted a hinge 19, which is connected to a pendulous frame 16 inside via a hinge link 20. A reducer 8 is arranged at the bottom of the pendulous frame 15, and the motor 6 and an bevel gear box 7 are mounted on shelf 21 of the pendulous frame 16. The shaft of the bevel gear box 7 and the input shaft of the speed reducer 8 are mounted with a chain wheel respectively, and the two chain wheels are connected to each other by a chain 27. The output shaft of the reducer 8 is mounted with the pinion 9 and a pinion pilot wheel 10, and the pinion 9 is engaged with the rack 11, arched rail of pendulous wheels 32 is arranged at the bottom of the reciprocating frame 15, and two pendulous wheels 25 are mounted at the bottom of a pendulous frame 16 and restrained by the arched rail 32. The reciprocating frame 15 is connected to the steel wire rope 5 at the upper portion thereof. At the rear inside portion of the housing 2 is mounted a power cable box 22, in the middle portion of which is a cable opening 23. Crown block are mounted on the upper portion of the housing 2, wherein two double-groove sheaves 3 are arranged in the front portion thereof, while two single-groove sheaves 4 are arranged in the rear portion thereof. The steel wire rope 5 passes through rear portions of the crown block and connects to a balance-weight box 24. The whole machine housing is a sealed space, and the balance-weight box 24 is arranged outside the housing 2.

The balance-weight box 24 is suspended outside the housing 2. A hanging ring 26 is mounted at the upper portion of the balance-weight box 24 and connected to the steel wire rope 5. There is a rectangular opening provided at a side of the weight box 24 proximal to the housing 2. A horizontal wheel 28 and a longitudinal wheel 29 are mounted respectively at two sides of the rectangular opening. There is a rail outside the housing 2, in which the horizontal wheel 28 and the longitudinal wheel 29 are mounted. The outside portion of the balance-weight box 24 is a frame 30, in which a balance-weight 31 is mounted. The top of the housing 2 is a work platform, where operations, such as maintenance, inspection, grease pouring and the like, can be performed.

A power cable box 22 is mounted in the rear interior portion of the housing 2, and the power cable box 22 has a thin space. One side of the power cable box 22 is an inner wall of the housing 2, while the other side thereof is a baffle made of profile steel and rebar, and in the middle of the baffle is an opening 23. A cable conduit 34 is mounted between the motor 6 and the power cable box 22, and the power cable 33 extends through the cable conduit 34 and connects to the power cable box 22. The cable 33 passes through the cable box 22 and connects to outside of the housing 2 via an observation window of the housing 2. The cable 33 can move up and down in the long and thin space, and can turn around with a large radius, without being damaged. The housing 2 is high, such that even the lowest position thereof is distant from the oil, thus no oil will stick to the cable.

The reciprocating frame 15 is connected to the steel wire rope 5 on the upper portion thereof. The pendulous frame 16 is mounted within the reciprocating frame 15 and connected thereto by the hinge link 20. the reducer 8 is arranged at the bottom of the pendulous frame 16, and the motor 6 and the bevel gear box 7 are mounted on the shelf 21 of the pendulous frame 16. Each of the shaft of the bevel gear box 7 and the input shaft of the reducer 8 is provided with a chain wheel, and the two chain wheels are connected with each other via a chain 27. Two pendulous wheels 25 are mounted at the bottom of the pendulous frame 16.

During operation, the motor 6 drives the bevel gear box 7, the output shaft of which is provided with a chain wheel connecting to the chain wheel on the input shaft of the reducer 8 via a chain 27. The pinion 9 and pilot guide wheel 10 are mounted on the output shaft of the reducer 8, wherein the pilot guide wheel 10 runs in the rail, and the pinion 9 is engaged with the rack 11, thus driving the pendulous frame 16 and in turn driving the reciprocating frame 15 to move along the guide rails. When the reciprocating frame 15 moves closer to the upper or lower dead point, the pinion 9, engaged to the rack 11, also drives the reducer 8 to move horizontally. There are pendulous wheels 25 at the bottom of the reducer 8, and the pendulous wheels 25 then move transversely along the arched rail 32, so the direction thereof changes. In such way the pinion 9 can reciprocate on the rack 11. The upper portion of the reciprocating frame 15 is connected to the steel wire rope 5. The reciprocating frame 15, the pendulous frame 16, the motor 6, the bevel gear box 7, and the reducer 8 also function as the balance-weight of the pump unit. Another part of the balance-weight, i.e. the balance-weight box 24, is suspended outside the housing 2. When the reciprocating frame 15 moves up and down, the balance-weight box 24 runs up and down synchronously, thus driving the steel cable 5 up and down, realizing the operation of pumping oil.

The invention claimed is:

1. An oil pumping machine with pinion reciprocating on rack, the oil pumping machine comprising a base, a housing, a crown block, a steel wire rope, a motor, a reducer, a pinion, and a rack;

a rack seat in an endless oblong shape is fixed on the inner sides of a front portion of the housing, and the rack is secured on the rack seat presenting an endless oblong rail;

the two inner sides of the housing are provided with guiding rails for a reciprocating frame;

at each of four corners of the reciprocating frame, a horizontal guiding wheel and a longitudinal guiding wheel are mounted;

at a middle point of an upper portion of the reciprocating frame, a hinge is mounted, which is connected to a pendulous frame inside the reciprocating frame via a hinge link;

an output shaft of the reducer is mounted with a pinion pilot wheel and a pinion;

the pinion is engaged with the rack;

an arched rail is provided at a bottom of the reciprocating frame;

two pendulous wheels are mounted at the bottom of the pendulous frame and restrained by the arched rails; and an upper portion of the reciprocating frame is connected to a steel wire rope to drive the steel wire rope, realizing the operation of pumping oil.

2. The oil pumping machine with pinion reciprocating on rack according to claim 1, wherein the upper and lower portions of the rack seat presenting the closed annular rail include semicircular rails, and the middle portion of the rack seat comprises spaced rails.

3. The oil pumping machine with pinion reciprocating on rack according to claim 1, wherein a power cable box is mounted in a rear interior portion of the housing, and in the middle of the power cable box is an opening.

4. The oil pumping machine with pinion reciprocating on rack according to claim 1, wherein a crown block is mounted on the upper portion of the housing, wherein one of two double-groove sheaves and four single-groove sheaves are arranged in the front portion, and two single-groove sheaves are arranged in the rear portion.

5. The oil pumping machine with pinion reciprocating on rack according to claim 4, wherein the steel wire rope passes through the rear sheaves of the crown block and connects to a balance-weight box, and the balance-weight box is arranged outside the housing.

6. The oil pumping machine with pinion reciprocating on rack according to claim 1, wherein:

the upper portion of the reciprocating frame is connected to the steel wire rope;

the pendulous frame is mounted within the reciprocating frame;

the reducer is arranged at the bottom of the pendulous frame, and the motor and a bevel gear box are mounted on a shelf of the pendulous frame;

each of the shaft of the bevel gear box and the shaft of the reducer is mounted with a chain wheel; and a chain is mounted between the two chain wheels.

7. The oil pumping machine with pinion reciprocating on rack according to claim 1, wherein:

the balance-weight box is outside the housing;

a hanging ring is mounted at the upper middle portion of the balance-weight box and the balance-weight box is connected to the steel wire rope;

a rectangular opening is provided at the side of the weight box proximal to the housing;

at each of the two sides of the rectangular opening, a horizontal wheel and a longitudinal wheel are mounted;

at the outer side of the housing is a rail, in which the horizontal wheel and the longitudinal wheel are arranged; and at an outer side of the balance-weight box is reinforced for a carry balance-weight.

8. The oil pumping machine with pinion reciprocating on rack according to claim 1, wherein:

the housing is a closed rectangle box;

the front portion and the rear portion of the housing are provided with windows;

a power cable box is mounted in the rear interior portion of the housing;

one side of the cable box is an inner wall of the housing, while the other side thereof is a baffle made of profile steel and rebar, in the middle of the baffle is an opening;

a bent steel pipe is mounted between the motor and the power cable box, and the cable passes through the cable conduit and connects to the power cable box; and the power cable passes through the power cable box and connects to outside of the housing via an observing window of the housing.

9. The oil pumping machine with pinion reciprocating on rack according to claim 1, wherein the pinion and the pinion pilot wheel are mounted on the output shaft of the reducer, the pinion is in a front position while the pinion pilot wheel is in a rear position coaxially.

\* \* \* \* \*